(12) United States Patent
Gossweiler et al.

(10) Patent No.: US 8,319,087 B2
(45) Date of Patent: *Nov. 27, 2012

(54) SYSTEM AND METHOD FOR DYNAMIC, FEATURE-BASED PLAYLIST GENERATION

(75) Inventors: Rich Gossweiler, Sunnyvale, CA (US); Douglas Eck, Palo Alto, CA (US); Hrishikesh Aradhye, Santa Clara, CA (US); Tomas Izo, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/076,223

(22) Filed: Mar. 30, 2011

(65) Prior Publication Data

US 2012/0254806 A1    Oct. 4, 2012

(51) Int. Cl.
*G10H 1/00* (2006.01)
(52) U.S. Cl. ............................. 84/600; 700/94
(58) Field of Classification Search ............ 84/600–602; 700/94
See application file for complete search history.

(56) References Cited

U.S. PATENT DOCUMENTS

| | | | |
|---|---|---|---|
| 7,296,031 B1 | 11/2007 | Platt et al. | |
| 7,345,232 B2 | 3/2008 | Toivonen et al. | |
| 7,973,231 B2* | 7/2011 | Bowen | 84/612 |
| 2001/0039872 A1 | 11/2001 | Cliff | |
| 2006/0107822 A1* | 5/2006 | Bowen | 84/612 |
| 2007/0038672 A1 | 2/2007 | Plastina et al. | |
| 2007/0044641 A1* | 3/2007 | McKinney et al. | 84/612 |
| 2007/0113725 A1* | 5/2007 | Oliver et al. | 84/612 |
| 2008/0126384 A1* | 5/2008 | Toms et al. | 707/102 |
| 2008/0188354 A1* | 8/2008 | Pauws et al. | 482/8 |
| 2008/0301173 A1* | 12/2008 | Ryu et al. | 707/102 |
| 2009/0055006 A1* | 2/2009 | Asano | 700/94 |
| 2009/0139389 A1* | 6/2009 | Bowen | 84/636 |
| 2009/0240355 A1* | 9/2009 | Buil et al. | 700/94 |
| 2009/0313302 A1 | 12/2009 | Teal | |
| 2010/0057555 A1* | 3/2010 | Butterfield et al. | 705/14.41 |
| 2010/0186578 A1* | 7/2010 | Bowen | 84/612 |
| 2010/0188405 A1* | 7/2010 | Haughay et al. | 345/440 |

(Continued)

FOREIGN PATENT DOCUMENTS

WO    WO 2006/126135 A2    11/2006

(Continued)

OTHER PUBLICATIONS

Flexer et al., "Playlist Generation Using Start and End Songs," ISMIR 2008—Session 2a—Music Recommendation and Organization, 2008, pp. 173-178.

(Continued)

*Primary Examiner* — David S. Warren
(74) *Attorney, Agent, or Firm* — Sterne, Kessler, Goldstein & Fox

(57) ABSTRACT

Methods and systems for generating playlists of media items with audio data are disclosed. Based on two received feature sets, media items corresponding to each feature set are identified. Transition characteristics are also received. Based on the identified media items and transition characteristics, a dynamic playlist is generated that transitions from media items having characteristics of the first feature set to media items having characteristics of the second feature set. Each time the playlist is generated, it may include a different set of media items.

23 Claims, 6 Drawing Sheets

U.S. PATENT DOCUMENTS

| | | | |
|---|---|---|---|
| 2010/0229094 A1* | 9/2010 | Nakajima et al. | 715/727 |
| 2010/0273610 A1* | 10/2010 | Johnson | 482/9 |
| 2011/0016120 A1* | 1/2011 | Haughay et al. | 707/734 |
| 2011/0035035 A1* | 2/2011 | Khan et al. | 700/94 |
| 2011/0179943 A1* | 7/2011 | Bowen | 84/612 |
| 2011/0184542 A1* | 7/2011 | Tsoneva et al. | 700/94 |
| 2011/0231426 A1* | 9/2011 | Fejta et al. | 707/769 |
| 2011/0234480 A1* | 9/2011 | Fino et al. | 345/156 |
| 2011/0295843 A1* | 12/2011 | Ingrassia et al. | 707/723 |

FOREIGN PATENT DOCUMENTS

| | | |
|---|---|---|
| WO | WO 2007/105180 A2 | 9/2007 |

OTHER PUBLICATIONS

Office Action mailed Jan. 3, 2012, in U.S. Appl. No, 13/251,119, Gossweiler et al., filed Sep. 30, 2011.

International Search Report and Written Opinion of International Application No. PCT/US2012/030929, European Patent Office, Netherlands, mailed on Jun. 5, 2012.

Vignoli et al., "Visual Playlist Generation on the Artist Map," Proceedings Annual International Symposium on Music Informationretrieval, Sep. 14, 2005, pp. 520-523.

\* cited by examiner

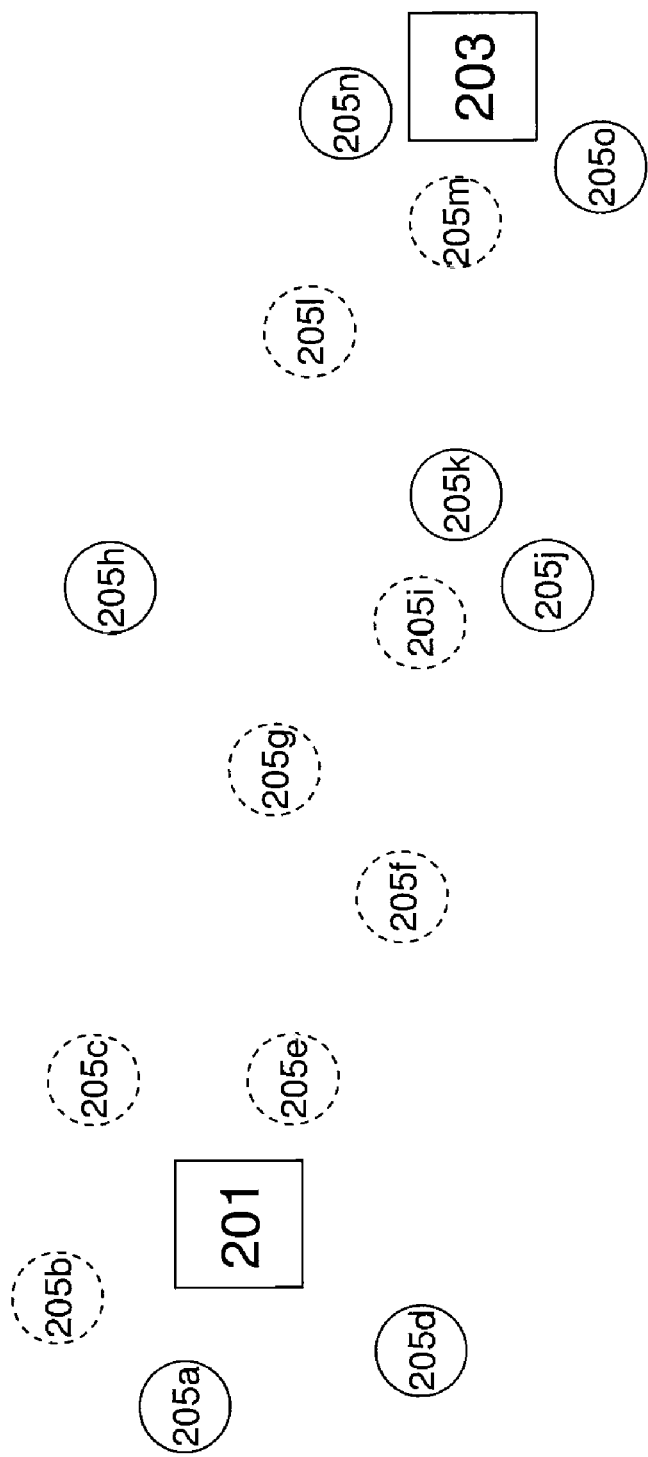

SYSTEM AND METHOD FOR DYNAMIC, FEATURE-BASED PLAYLIST GENERATION

BACKGROUND

1. Field

Embodiments relate to automatic generation of media item playlists.

2. Background Art

Creating playlists of media items, including songs and videos, can often be a highly manual process. Usually, building such playlists requires a user to select individual songs or videos to create a playlist of desired length. Such a process may be tedious, and often results in static playlists that become repetitive. Such playlists do not change over time without user intervention, and modifying the playlists may similarly be a tedious process. Further, users who are manually creating playlists may wish to have playlists appropriate for a time of day or mood, or that are limited to a particular length.

BRIEF SUMMARY

A system and method of generating a playlist based on existing media items with audio data are disclosed. First and second feature sets, each feature set corresponding to an existing media item, are received. Additionally, transition characteristics are received. Media items corresponding to characteristics of the first feature set, characteristics of the second feature set, and characteristics of both the first and second feature set are identified. Based on the identified media items and transition characteristics, a playlist is generated that transitions from media items having characteristics contained in the first feature set to media items having characteristics contained in the second feature set. The playlist transitions according to the received transition characteristics.

A further method of generating a playlist based on existing media items is disclosed. First and second feature sets are received. Additionally, context data is detected. Media items corresponding to characteristics of the first feature set, characteristics of the second feature set, and characteristics of both the first and second feature set are identified. Based on the context data and identified media items, a playlist is generated.

A further method of generating a playlist is disclosed. First and second feature sets are received. A desired length for the playlist is received as well. Media items are dynamically selected for the playlist, based on the position of the playlist and media items that correspond to either or both of the feature sets.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

FIG. 1 is a flow diagram of an exemplary method of generating a playlist based on one or more media items.

FIGS. 2A-B are diagrams of exemplary playlists generated in accordance with embodiments.

DETAILED DESCRIPTION

Disclosed systems and methods relate to the generation of media item playlists based on one or more feature sets. Creating playlists of media items is often a manual process undertaken by users who wish to listen to a group of songs in a particular order. However, this process is a highly tedious, manual process. Thus, embodiments utilize feature sets, which may be generated and extracted from media items or other data, and received transition characteristics, to generate a playlist with minimal user involvement.

While the present invention is described herein with reference to the illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In the detailed description of embodiments that follows, references to "one embodiment", "all embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it could be within the knowledge of one skilled in the art to effect such feature, structure, or characteristic in connection with other embodiments whether or not explicitly described.

Figure 1:
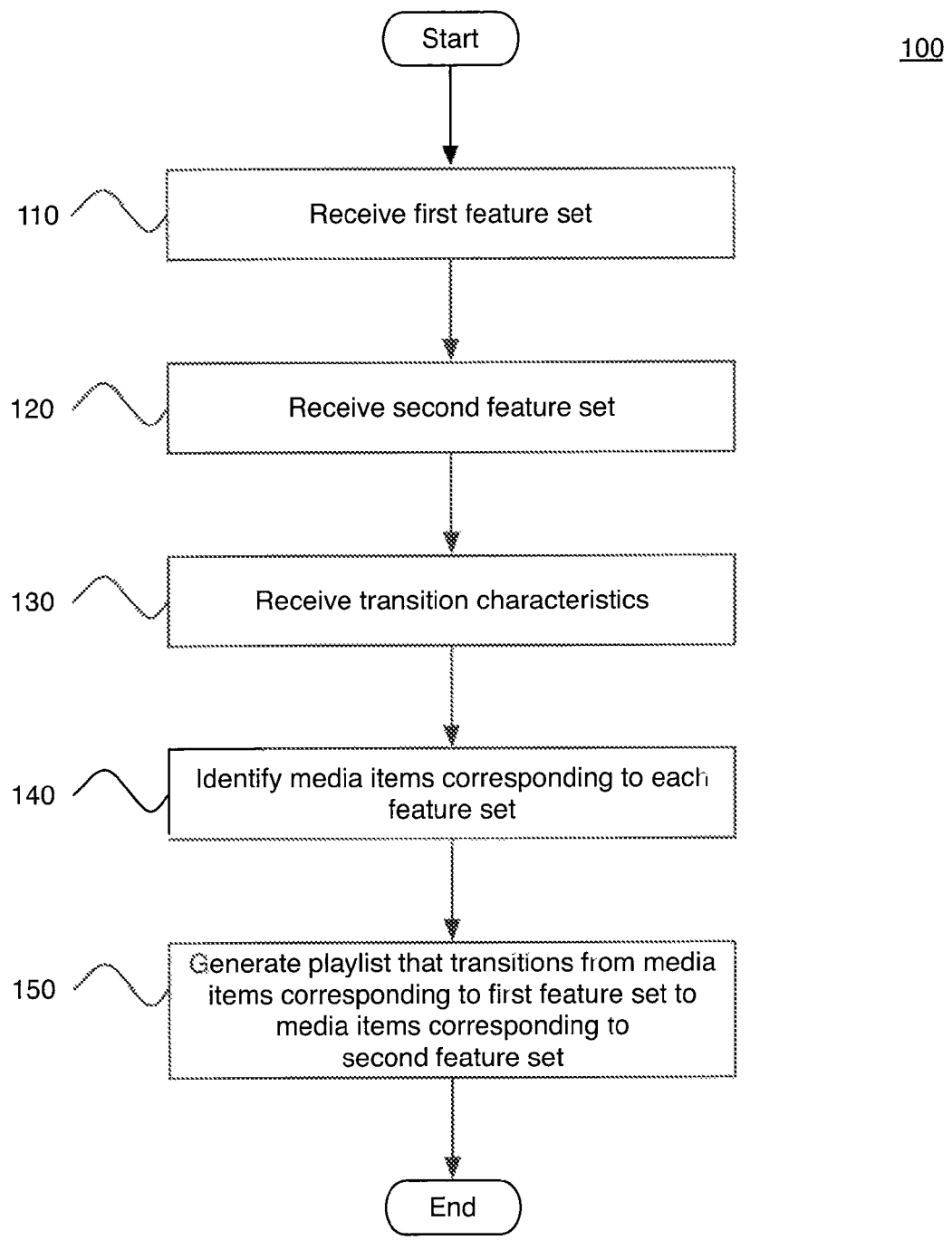

FIG. 1 is a flowchart of an exemplary method 100 for generating a playlist of media items with audio. Media items with audio may be accessed, for example and without limitation, in a computer, a database, a cloud computing environment, a mobile device, a personal media device, or any combination thereof. Media items with audio may be files, such as songs, encoded in MP3, AAC, WAV, WMA, OGG, M4A, or other audio format, or video files encoded in AVI, WMV, FLASH, H.264, or other video format.

At block 110, a first feature set is received. The first feature set may be based on features generated and extracted from one or more particular media items with audio data selected by a user. For example, a user may select the song "Imagine" by John Lennon. The feature set may also be generated based on one or more elements of play frequency, user selected genres, or user selected elements of metadata. A feature set may also be received based on input from a user. For example, the feature set "mellow" may be received from a user.

At block 120, a second feature set is received. The second feature set may again be based on features extracted by any of the methods explained with respect to block 110. In an example, the second feature set may be generated based on the song "Candle in the Wind" by Elton John.

At block 130, transition characteristics are received. Transition characteristics may include, for example and without limitation, a particular point at which a playlist should transition from one feature set to another feature set. For example, by default, transition characteristics may result in a generated playlist that transitions from the first feature set to the second feature set smoothly without any sudden jumps. Transition characteristics also may specify that a generated playlist should contain 3 media items corresponding to the first feature set, and the remainder of media items from the second feature set, or vice versa. Transition characteristics may also specify an aggregate duration of time for media items corresponding to the first or second feature set. For example, the received transition characteristics may specify that the generated playlist should contain approximately 15 minutes (or any other length of time) of media items corresponding to the first or second feature set. Other transition characteristics may be possible, and may be known to those skilled in the art.

At block 140, media items corresponding to each feature set are identified in the library of media items with audio data. According to the example given above, a user may generate a first feature set based on the song "Imagine" by John Lennon. Accordingly, the first feature set may include characteristics such as songs featuring pianos, songs with solo male vocals, and songs by members of The Beatles. The second feature set, based on the song "Candle in the Wind", may also include characteristics such as songs featuring pianos, songs with solo male vocals, and songs created or performed by Elton John. Media items may be identified using a simple search of data associated with each media item. Other methods of identifying media items corresponding to feature sets are explained further below.

At block 150 then, a playlist of media items is generated which transitions from media items corresponding to the first feature set, to media items corresponding to the second feature set. The playlist may transition according to the transition characteristics received at block 130.

For example, a playlist may be generated that begins with the song "Imagine" and ends with "Candle in the Wind." Media items between the two end media items may share characteristics of each end point. For example, after "Imagine" the song "Maybe I'm Amazed" by Paul McCartney may be included on the playlist. The song shares features of "Imagine" in that it features solo male vocals, a piano, and a member of the Beatles. A next song may be a cover of "Lucy in the Sky With Diamonds" performed by Elton John, which features solo male vocals, a song created by members of the Beatles, and performed by Elton John. Finally, the song "Candle in the Wind" may end the playlist.

Feature sets may be generated using a processing device such as a laptop computer, desktop computer, server, mobile device, personal media player, or any other appropriate processing device. Feature sets may be generated by many different techniques. For example, feature sets may be generated based on a media item selected by a user. As above, a feature set may be generated by the song "Imagine."

Further, feature sets, may be generated based on one or more elements of metadata. For example, media files encoded in the MP3 format often contain metadata in the form of ID3 tags. ID3 tags may include metadata such as the year a particular song was created, the composer of a particular song, and the track number of a song if it was originally included on a compact disc. Thus, a feature set may be generated based on metadata contained, for example and without limitation, in an ID3 tag.

Feature sets may also be generated based on one or more user selected genres. For example, a user may select "blues" as a genre to generate a first feature set. Based on the user selected genre, the feature set may include characteristics of songs that feature the guitar, songs that are in the same key as typical blues songs, or songs that share the common 12-bar blues structure.

Feature sets may also be generated based on statistics of user play frequency. For example, many media players retain statistics on how often particular media items, such as songs or videos, are played by a user. Thus, a feature set may be generated to identify media items that have been played a particular number of times. For example, a user may have played the song "Imagine" 27 times since adding the song to her media library. Thus, a playlist may be generated that only includes media items that have been played 27 times or more. Additionally, a playlist may be generated that only includes media items that have been played between 20 and 30 times.

Feature sets may also be generated on the basis of detected context data. For example, a smartphone may detect the time of day, the user's location, the current weather, and whether the user is near other people, and use this information to generate feature sets. For example, a feature set may be generated based on the fact that a user is alone, at home, at 9:00 PM, and the current weather indicates rain. A different feature set may be generated if the user is with friends at a restaurant, in the morning, while the sun is shining. Other context data may be detected and included as well. A feature set may be generated based on one or more elements of the detected context data.

The playlist generated at block 150 may be limited to a specified length. For example, a desired number of media items may be received from a user. Only the desired number of media items may be identified at block 140 and used to generate a playlist at block 150.

In a further embodiment, a duration or length of time may be received from a user. For example, a user may wish to create a 30 minute playlist. One or more media items identified at block 140 may be selected by a processing device such that the aggregate duration of all media items selected is approximately equal to the received desired duration.

Identifying media items at block 140 may be implemented with the assistance of cluster analysis techniques. For example, feature sets received at block 110 and block 120 may be represented as vectors of various characteristics of each feature set. Further, each media item may be represented by a vector indicating the characteristics exhibited by the media item. The distance between two vectors may be measured by the cosine similarity of the two vectors, or any other known distance measure.

Depending on the implementation of embodiments, media item vectors that are clustered closely to feature set vectors may lead to such media items being added to a generated playlist. For example, given a particular feature set, 10 media items may cluster near the particular feature set. Given two feature sets, a set of media items may cluster around each feature set. A generated playlist may begin with media items clustered around the first feature set, progress to media items clustered between both feature sets, and terminate with media items clustered around the second feature set.

In a further embodiment, one feature set vector is utilized. The feature set vector may begin as a vector of characteristics of the first received feature set. As the playlist progresses, the feature set vector may be modified to exhibit characteristics of both feature sets, until it exhibits characteristics of the second received feature set. In order to generate a playlist at block 150, each time the feature set vector is modified, media items clustered closest to the feature set vector may be selected for the playlist at that specific time.

A feature of the disclosed systems and methods is that each time a playlist is generated, different media items clustered near the particular feature set may be used in the generated playlist. Thus, a playlist generated in accordance with the various embodiments may be constantly dynamic. Each time the two particular feature sets are received, different media items may be selected to generate the playlist.

Figure 2B:
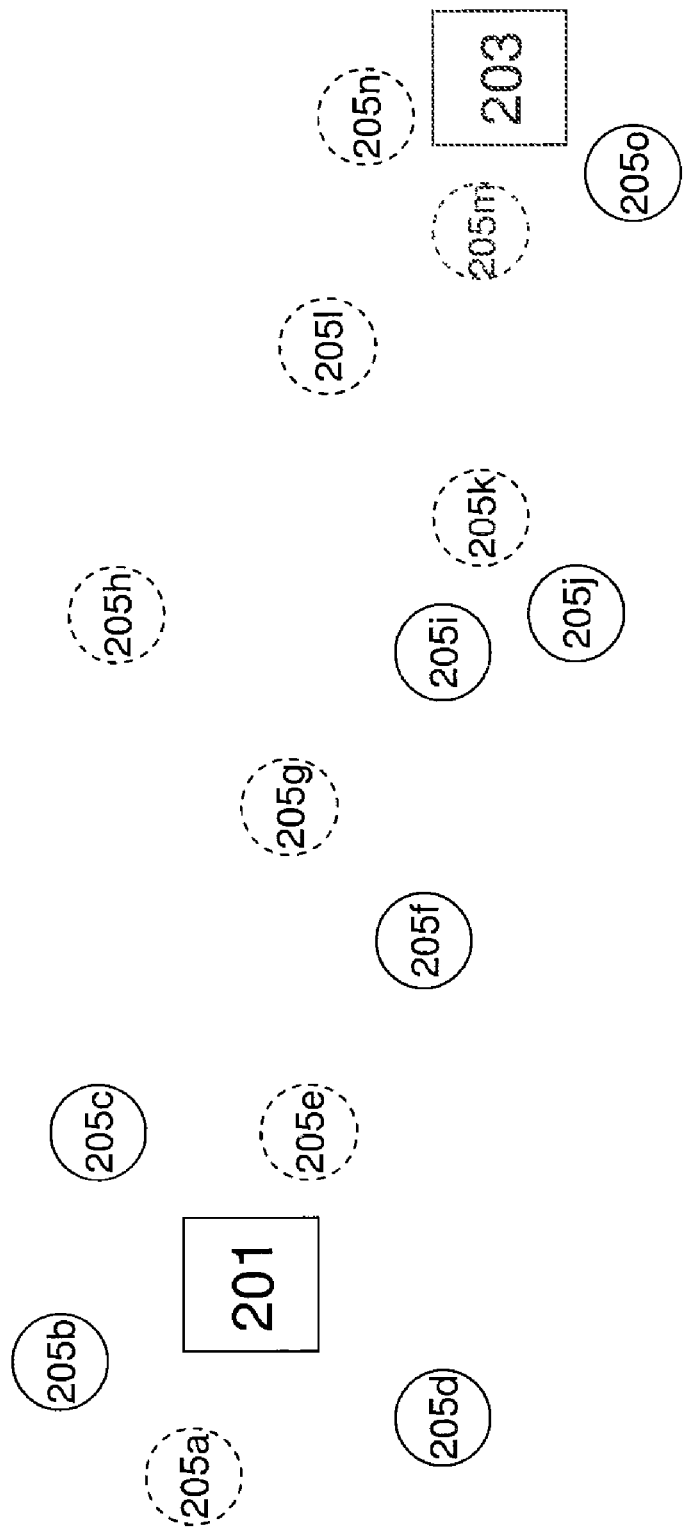

The disclosed systems and methods may be understood with the assistance of FIGS. 2A and 2B. Elements 201 and 203 represent feature set vectors. Elements 205a-205o may represent media item vectors. As FIGS. 2A and 2B show, each media item vector 205a-205o is clustered near feature set 201 or feature set 203, or between the two feature sets. Media items clustered near each feature set may be selected at random, or according to other criteria, to generate a playlist. As explained above, each time a playlist is generated may result in a different list of media items. For example, a playlist may be desired that includes 8 media items. The first time the playlist is generated, media items 205b, 205c, 205e, 205f, 205g, 205i, 205l, and 205m of FIG. 2A, indicated by dashed lines, may be included in a generated playlist. A second time the playlist is generated may result in the playlist of FIG. 2B, containing media items 205a, 205e, 205g, 205h, 205k, 205l, 205m, and 205n.

Depending on the implementation of various embodiments, after media item vectors are clustered near feature set vectors, a user may specify transition characteristics as if she is drawing a curve between media item vectors. For example, the user may be presented with a display of media items arranged as shown in FIG. 2A, and may specify a path that she wishes her desired playlist to take.

The playlist of FIG. 2B may be automatically generated at the end of the playlist of FIG. 2A. That is, when media item 205m ends, software or a device implementing embodiments disclosed herein may automatically generate the playlist of FIG. 2B and start playing media item 205a, as if the playlist is "looping". Further, depending on the implementation of embodiments, the playlist generated on the second iteration may not contain any duplicate media items from the first generated playlist.

Although various embodiments are described with reference to two feature sets, a user may specify additional feature sets. For example, a user may specify three feature sets, and a playlist maybe generated that transitions from media items corresponding to the first feature set, to media items corresponding to the second feature set, and ending in media items corresponding to the third feature set.

Figure 3:
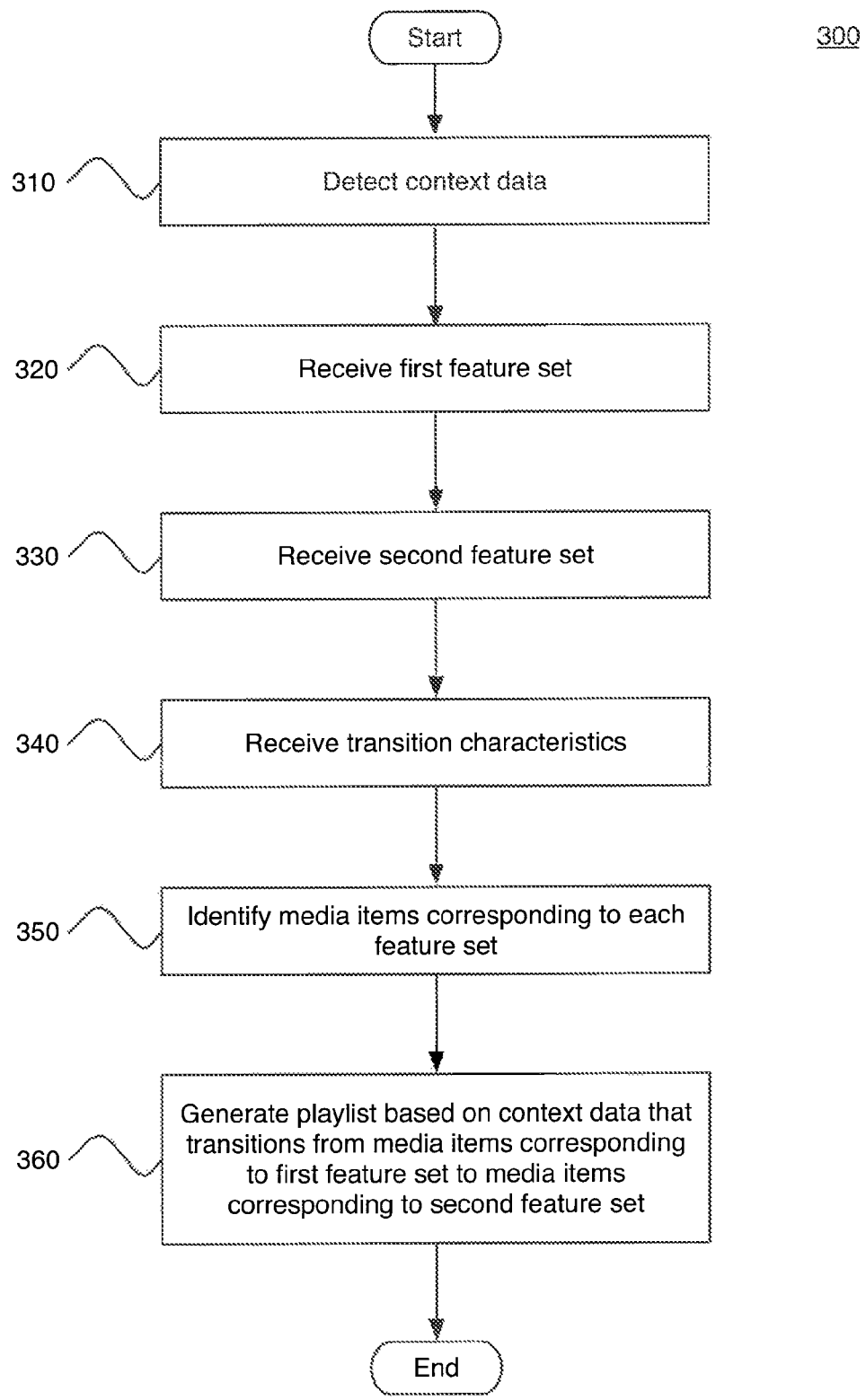
FIG. 3 is a flow diagram of an exemplary method of generating a playlist based on one or more media items and context data.

FIG. 3 is a flowchart of an exemplary method 300 for generating a playlist of media items with audio data. As above, media items with audio data may be accessed, for example and without limitation, in a computer, database, cloud computing environment, mobile device, personal media device, or any combination thereof.

At block 310, context data is detected. For example, context data may include the current time of day. Further, context data may include the current and past position of the user or media device. For example, in a mobile device or smartphone, a GPS sensor may detect data indicating that the user is currently moving. The GPS sensor may also detect that a user is currently at home, at work, or may be in a vacation location such as a beach. Context data may also include, for example and without limitation, the current weather, the amount of light detected by a light sensor, ambient sounds detected by a microphone, or any other data. Context data may be dependent on the type of device used by a particular user.

At block 320, a first feature set is received. The first feature set may be based on features generated and extracted from one or more particular media items with audio data selected by a user. Feature sets may also be generated using a user selected element of metadata, a user selected genre, or statistics of user play frequency.

At block 330, a second feature set is received. The second feature set may be generated in a similar fashion to the first feature set.

At block 340, desired transition characteristics are received. As stated above, transition characteristics may specify how a generated playlist transitions from media items corresponding to the first feature set to media items corresponding to the second feature set.

At block 350, media items corresponding to each feature set are identified. Media items may be identified using clustering, as explained above, or any other known method of identifying media items with received feature sets.

At block 360, a playlist of media items is generated which transitions from media items corresponding to the first feature set, to media items corresponding to the second feature set, and that further takes into account detected context data. For example, if detected context data indicates that a user is moving, for example, the generated playlist may include media items that transition from a slower tempo to a faster tempo. Similarly, detected context data may indicate that the ambient light level is low, indicating a user preference for relaxing music. Thus, a generated playlist may transition to progressively slower media items.

As detailed above, feature sets may be generated by a processing device based on a number of inputs. For example, a feature set may be generated based on user selected media items, genres, elements of metadata, or play frequency.

The playlist generated at block 360 may be limited to a specified length. Thus, a desired number of media items for the playlist may be received from a user. In accordance with this embodiment, only the desired number of media items may be identified at block 350 and used to generate a playlist at block 360.

Further, a desired duration of a generated playlist may be received. For example, a user may wish to create a 60 minute playlist. Thus, media items having an aggregate duration of approximately 60 minutes may be selected in accordance with block 350 of method 300.

Figure 4:
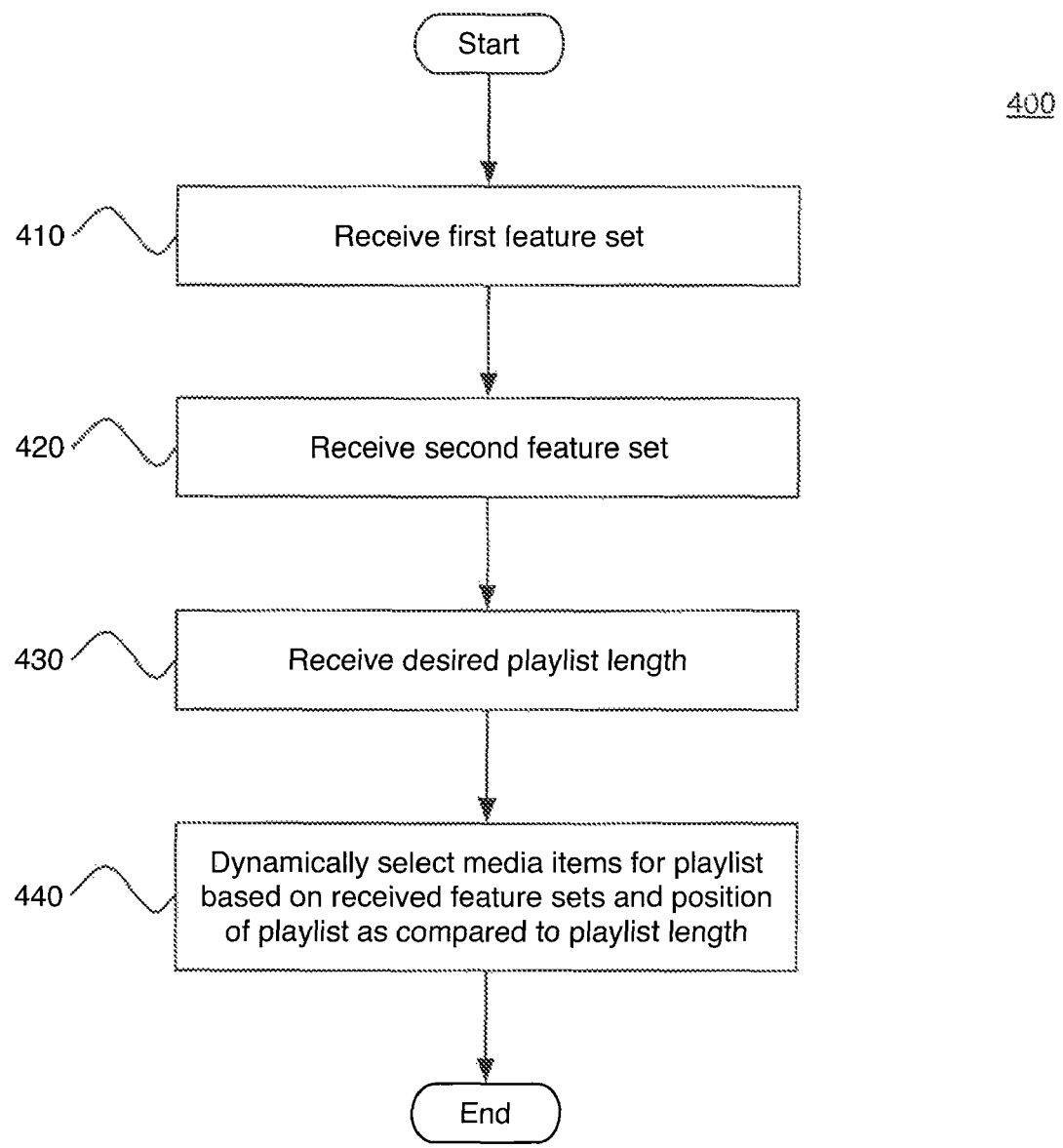
FIG. 4 is a flow diagram of an exemplary method of generating a playlist of desired length.

FIG. 4 is a flowchart of an exemplary method 400 for generating a playlist of media items with audio data, in accordance with a further embodiment. As previously stated, media items with audio data may include songs, and may be accessed, for example and without limitation, in a computer, database, cloud computing environment, mobile device, personal media device, or any combination thereof.

At block 410, a first feature set is received. The first feature set may be based on features generated and extracted from one or more media items with audio data selected by a user. Feature sets may also be generated using a user selected element of metadata, a user selected genre, or statistics of play frequency.

At block 420, a second feature set is received. The second feature set may be generated in a similar fashion to the first feature set.

At block 430, a desired playlist length is received. The desired playlist length may be a number of desired media items. Further, the desired playlist length may be a duration in minutes, hours or days.

At block 440, media items are dynamically selected for a playlist, based on the received feature sets and the position of the playlist as compared to the desired playlist length.

As an example, at block 430, a user may desire a 30 minute long playlist. Accordingly, the first media item selected for the playlist may be very similar to the first received feature set. At 4 minutes into the playlist, the media item selected for the playlist may be very similar to the first received feature set, but begins to transition towards features of the second received feature set. At 15 minutes into the playlist, the media item selected may equally share characteristics of the first feature set and second feature set. At 26 minutes into the playlist, the media item selected may be very similar to the second received feature set.

A similar progression may occur if, at block 430, a user desires a playlist with 20 media items. The first media item may exactly match the first received feature set. The 20$^{th}$ media item may exactly match the second received feature set. Accordingly, media items 9, 10 and 11, for example, may equally share characteristics of the first and second received feature sets.

Feature sets may be generated based on user selected media items, user selected elements of metadata, user selected genres, or statistics of user play frequency.

Figure 5:
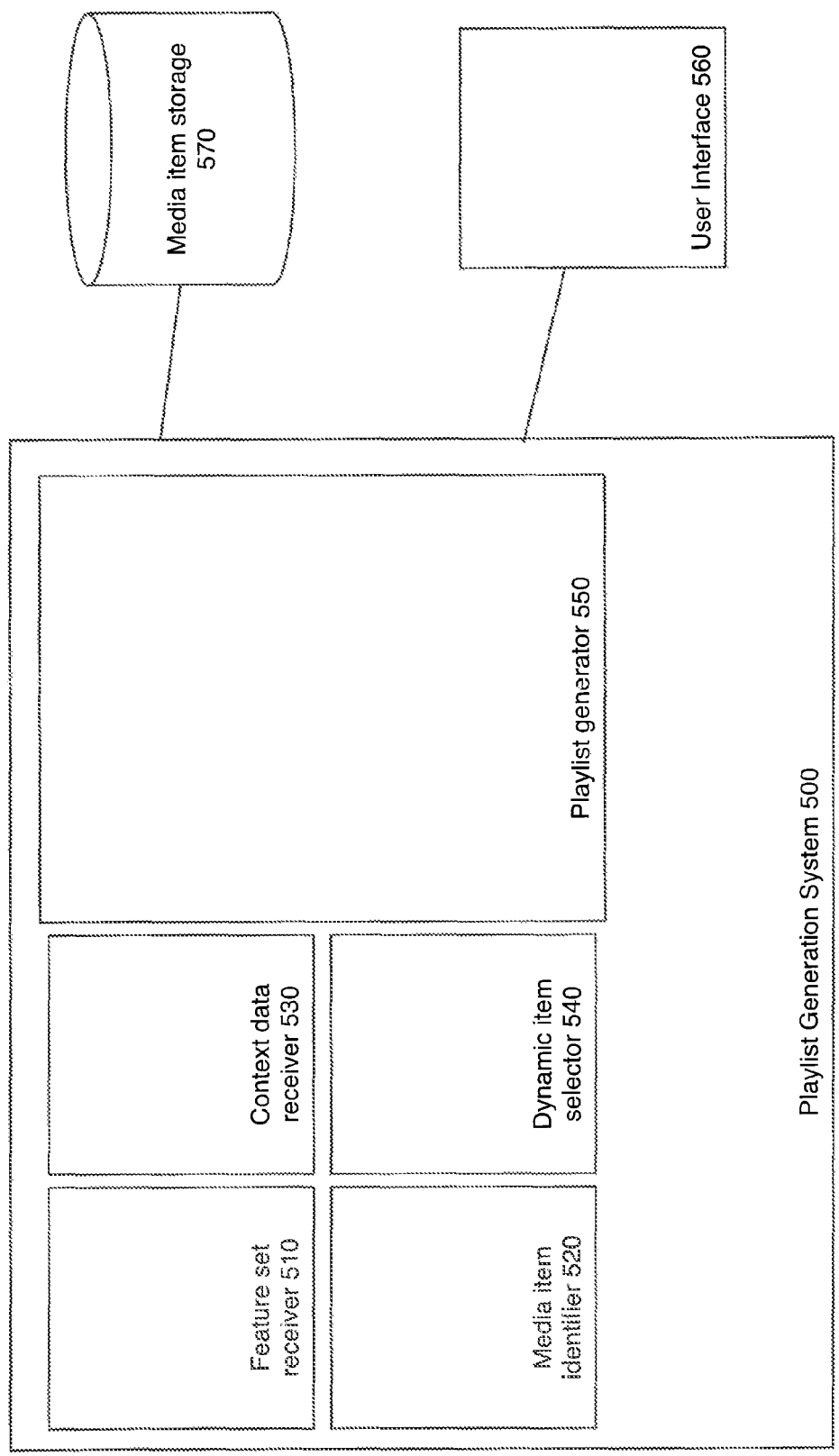
FIG. 5 is a diagram of a playlist generation system used to implement embodiments disclosed herein.

FIG. 5 is a diagram of a playlist generation system 500 that may be used to implement embodiments disclosed herein.

System 500 includes a feature set receiver 510. Feature set receiver 510 may be configured to receive one or more feature sets from a user, generated in accordance with embodiments disclosed herein. Feature set receiver 510 may be configured to generate feature sets based on one or more received media items or other data.

System 500 may also include media item identifier 520. Media item identifier 520 may be configured to determine media items that share characteristics with one or more received or generated feature sets. Media item identifier 520 may be configured to use one or more clustering algorithms or techniques to determine media items that are related to a feature set.

System 500 may also include context data detector 530. Context data detector 530 may detect one or more elements of context data, such as the time of day, ambient light, position, position change, or any other element of context data, in accordance with block 310 of method 300.

System 500 may also include dynamic item selector 540. Dynamic item selector 540 may operate in conjunction with media item identifier 520 to dynamically select items for a playlist, in accordance with block 440 of method 400.

System 500 may also include playlist generator 550. Playlist generator 550 may operate in conjunction with the various other components of system 500 to generate playlists. For example, playlist generator 450 may operate in accordance with block 150 of method 100 and block 360 of method 300.

System 500 may be coupled to media item storage 570. For example and without limitation, system 500 may be connected to media item storage 570 over a network, or via a bus connecting a processor and memory. Media item storage 570 may be implemented on a computing device, such as a computer, mobile device, set top box, server, cloud computing environment, or any other device capable of storing media items.

System 500 may also be coupled to user interface 560. User interface 560 may allow a user to control aspects of playlist generation system 500. For example, user interface 560 may allow a user to specify transition characteristics to playlist generator 550. Further, user interface 560 may allow a user to specify a desired playlist length, or allow a user to select feature sets to be received by feature set receiver 510.

Playlist generation system 500 may be implemented in software, firmware, hardware, or any combination thereof. The system can be implemented to run on any type of processing device including, but not limited to, a computer, workstation, distributed computing system, embedded system, stand-alone electronic device, networked device, mobile device, set-top box, television, or other type of processor or computer system. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm. Embodiments may be implemented via a set of programs running in parallel on multiple machines.

Embodiments may be directed to computer products comprising software stored on any computer usable medium. Such software, when executed in one or more data processing device, causes a data processing device(s) to operate as described herein.

The summary and abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A computer implemented method for generating a playlist of media items with audio or video data, comprising:
   creating a first feature set to be associated with one or more media items;
   creating a second feature set to be associated with one or more media items;
   receiving data indicating desired transition characteristics;
   identifying, using a clustering technique implemented by one or more processing devices, a set of media items, each media item corresponding to one or more characteristics of at least one of the first feature set and second feature set; and
   generating, by one or more processing devices, a playlist of media items from the identified set of media items which transitions from media items corresponding to characteristics of the first feature set to media items corresponding to characteristics of the second feature set according to the desired transition characteristics.

2. The method of claim 1, wherein the playlist of media items is a first playlist of media items, and further comprising:
generating, by one or more processing devices, a second playlist of media items from the identified set of media items which transitions from media items corresponding to characteristics of the first feature set to media items corresponding to characteristics of the second feature set according to the desired transition characteristics, wherein the first and second playlists of media items do not contain any duplicated media items.

3. The method of claim 1, wherein the first feature set is associated with a first feature set vector.

4. The method of claim 1, wherein the second feature set is associated with a second feature set vector.

5. The method of claim 1, wherein each media item is associated with a media item vector.

6. The method of claim 1, further comprising:
detecting context data; and
generating, by a processing device, each feature set based on one or more elements of detected context data.

7. The method of claim 6, wherein the context data includes one or more of a time of day, a weather condition, or an ambient light level.

8. A computer implemented method for generating a playlist of media items with audio or video data, comprising:
detecting context data to be associated with one or more media items;
creating a first feature set to be associated with one or more media items;
creating a second feature set to be associated with one or more media items;
identifying, using a clustering technique implemented by one or more processing devices, a set of media items, each media item corresponding to one or more characteristics of at least one of the first feature set and second feature set; and
generating, by one or more processing devices, a playlist of media items based on the detected context data and which transitions from media items corresponding to characteristics of the first feature set to media items corresponding to characteristics of the second feature set.

9. The method of claim 8, wherein the playlist of media items is a first playlist of media items, and further comprising:
generating, by one or more processing devices, a second playlist of media items based on the detected context data which transitions from media items corresponding to characteristics of the first feature set to media items corresponding to characteristics of the second feature set, wherein the first and second playlists of media items do not contain any duplicated media items.

10. The method of claim 8, wherein the first feature set is associated with a first feature set vector.

11. The method of claim 8, wherein the second feature set is associated with a second feature set vector.

12. The method of claim 8, wherein each media item is associated with a media item vector.

13. The method of claim 8, wherein the context data includes one or more of a time of day, a weather condition, or an ambient light level.

14. A system for generating a playlist of media items with audio or video data, comprising:

a receiver configured to receive a first feature set to be associated with one or more media items, a second feature set to be associated with one or more media items, and data indicating desired transition characteristics;
a media item identifier configured to identify media items in a library using a clustering technique, each media item corresponding to characteristics of at least one of the first or second feature sets;
a playlist generator configured to generate a playlist of media items which transitions from media items identified as corresponding to characteristics of the first feature set to media items identified as corresponding to characteristics of the second feature set according to the received transition characteristics.

15. The system of claim 14, further comprising a feature set generator to generate a feature set based on at least one of a user selected media item, user selected genre, or user selected element of metadata.

16. The system of claim 14, wherein the playlist of media items is a first playlist of media items, and wherein the playlist generator is further configured to:
generate a second playlist of media items from the identified set of media items which transitions from media items corresponding to characteristics of the first feature set to media items corresponding to characteristics of the second feature set according to the received transition characteristics, wherein the first and second playlists of media items do not contain any duplicated media items.

17. The system of claim 14, wherein the first feature set is associated with a first feature set vector.

18. The system of claim 14, wherein the second feature set is associated with a second feature set vector.

19. The method of claim 14, wherein each media item is associated with a media item vector.

20. The system of claim 14, further comprising:
a context data detector configured to detect one or more elements of context data; and
a feature set generator configured to generate each feature set based on the one or more elements of detected context data.

21. The system of claim 20, wherein the context data includes one or more of a time of day, a weather condition, or an ambient light level.

22. A computer-implemented method of generating a playlist of media items with audio or video data, comprising:
creating a first feature set to be associated with one or more media items;
creating a second feature set to be associated with one or more media items;
receiving a desired playlist length; and
dynamically selecting media items for a playlist using a clustering technique, each media item corresponding characteristics of at least one of the first or second feature sets based on a current position of the playlist as compared to the desired playlist length.

23. The method of claim 22, wherein the playlist is a first playlist, and further comprising:
determining that the first playlist has terminated;
dynamically selecting media items for a second playlist using the clustering technique, each media item corresponding to characteristics of at least one of the first or second feature sets based on a current position of the second playlist as compared to the desired playlist length.

* * * * *